United States Patent
Takahashi et al.

(10) Patent No.: US 12,190,624 B2
(45) Date of Patent: Jan. 7, 2025

(54) METHOD OF ACQUIRING BIOMETRIC INFORMATION ON SMALL ANIMALS, BIOMETRIC INFORMATION ACQUISITION PROGRAM, AND BIOMETRIC INFORMATION ACQUISITION DEVICE

(71) Applicant: IMAGING TECH LAB LLC, Chiba (JP)

(72) Inventors: Masato Takahashi, Chiba (JP); Norimichi Tsumura, Chiba (JP); Norio Iijima, Tochigi (JP)

(73) Assignee: IMAGING TECH LAB LLC, Chiba (JP)

( * ) Notice: Subject to any disclaimer, the term of this patent is extended or adjusted under 35 U.S.C. 154(b) by 0 days.

(21) Appl. No.: 17/777,895

(22) PCT Filed: Nov. 19, 2021

(86) PCT No.: PCT/JP2021/042616
§ 371 (c)(1),
(2) Date: May 18, 2022

(87) PCT Pub. No.: WO2022/118683
PCT Pub. Date: Jun. 9, 2022

(65) Prior Publication Data
US 2023/0245488 A1   Aug. 3, 2023

(30) Foreign Application Priority Data

Dec. 3, 2020  (JP) ................................ 2020-201373
Mar. 7, 2021  (JP) ................................ 2021-035903

(51) Int. Cl.
*G06V 40/10*   (2022.01)
*A01K 29/00*   (2006.01)

(52) U.S. Cl.
CPC ............ *G06V 40/10* (2022.01); *A01K 29/005* (2013.01)

(58) Field of Classification Search
CPC ...... G06V 40/10; G06V 10/14; A01K 29/005; A01K 29/00
See application file for complete search history.

(56) References Cited

U.S. PATENT DOCUMENTS

| | | | |
|---|---|---|---|
| 2008/0047043 A1* | 2/2008 | Flores-Garvey | ..... A41D 13/065 2/79 |
| 2010/0154094 A1* | 6/2010 | Calderwood | ......... A41D 11/00 2/24 |

(Continued)

FOREIGN PATENT DOCUMENTS

| | | |
|---|---|---|
| JP | 2007-050144 A | 3/2007 |
| JP | 2018-064497 A | 4/2018 |

(Continued)

OTHER PUBLICATIONS

"Vital Signs Monitoring System for Small Animals" on website of BIO Research Center Co., Ltd., <https://product.brck.co.jp/index.php/maker/h/harvardapparatus/vitalmonitoring> (retrieved on Nov. 1, 2020).

(Continued)

*Primary Examiner* — Solomon G Bezuayehu
(74) *Attorney, Agent, or Firm* — HAUPTMAN HAM, LLP

(57) ABSTRACT

An object of the present invention is to acquire biometric information on small animals without being affected by the movements of the small animals and also without giving stress to the small animals. The present invention includes the steps of: acquiring pieces of image information on a hand and/or a foot of a quadrupedal small animal; extracting a predetermined piece of signal information from among the pieces of image information that have been acquired; and (Continued)

processing the predetermined piece of the signal information which has been extracted so as to acquire biometric information on the small animal. The present invention further includes the step of capturing an image of an abdominal side of the small animal, and the step of capturing an image of the small animal from below a location of the small animal.

4 Claims, 12 Drawing Sheets

(56) References Cited

U.S. PATENT DOCUMENTS

| | | | |
|---|---|---|---|
| 2013/0096439 A1 | 4/2013 | Lee et al. | |
| 2015/0078626 A1* | 3/2015 | Kinard | A01K 11/00 382/110 |
| 2017/0202367 A1* | 7/2017 | Barbu-Roth | A47D 13/08 |
| 2019/0026453 A1* | 1/2019 | Choi | G06V 40/1324 |
| 2019/0026559 A1* | 1/2019 | Zhan | G06F 16/535 |
| 2019/0297252 A1* | 9/2019 | Choi | G06V 40/10 |
| 2020/0352136 A1* | 11/2020 | Hanson | A01K 15/021 |
| 2021/0049355 A1* | 2/2021 | Choi | G06V 10/762 |
| 2021/0113194 A1* | 4/2021 | Padwal | A61B 8/5223 |
| 2021/0295010 A1* | 9/2021 | Ross | G06V 40/63 |
| 2021/0386035 A1* | 12/2021 | Liao | G06F 18/24 |

FOREIGN PATENT DOCUMENTS

| | | |
|---|---|---|
| JP | 2019-092532 A | 6/2019 |
| WO | 2019/107246 A1 | 6/2019 |

OTHER PUBLICATIONS

"Blood Pressure Measurement for Laboratory Animals" on website of Softron Co., Ltd., <http://www.softron-tokyo.co.jp/seihin.html> (retrieved on Nov. 1, 2020).

Nagata et al, "Pulse wave estimation technology by non-contact sensing," IEICE Technical Report, vol. 119, No. 391, pp. 35-40, Jan. 18, 2020.

Tsumura, "Non-contact detection of biometric data using cameras," Chiba University VBL Annual Report, No. 19, pp. 7-10, Mar. 2019.

PCT/ISA/210 and PCT/ISA/237, "International Search Report and Written Opinion for PCT International Application No. PCT/JP2021/042616," Feb. 8, 2022.

* cited by examiner

METHOD OF ACQUIRING BIOMETRIC INFORMATION ON SMALL ANIMALS, BIOMETRIC INFORMATION ACQUISITION PROGRAM, AND BIOMETRIC INFORMATION ACQUISITION DEVICE

RELATED APPLICATIONS

The present application is National Phase of International Application No. PCT/JP2021/042616 filed Nov. 19, 2021, and claims priority from Japanese Applications No. 2020-201373, filed Dec. 3, 2020 and No. 2021-035903, filed Mar. 7, 2021, the disclosure of which is hereby incorporated by reference herein in its entirety.

TECHNICAL FIELD

The present invention relates to a biometric information acquisition method of acquiring biometric information on small animals such as mice, a biometric information acquisition program, and a biometric information acquisition device.

BACKGROUND ART

In the process of various research and development activities, it is known that experiments using small animals such as mice and rats are conducted. In such animal experiments, it is necessary to acquire biometric information, such as pulse rate, of a subject mouse. Conventionally, for this purpose, a device dedicated for acquiring biometric information on a mouse, which is to be implanted in the body of the mouse, has been used (see, for example, Patent Literature 1).

However, the above-mentioned method of acquiring biometric information from the device implanted in the body of a mouse requires an incision of a part of the body of the mouse in order to implant the device into the body thereof. This not only causes a physical burden on the mouse, but also is undesirable from the perspective of animal welfare.

There are also other methods of acquiring biometric information on a mouse, which are, for example, a method of anesthetizing the mouse to acquire the biometric information on the mouse under anesthesia (see, for example, Non-Patent Literature 1) and a method of acquiring biometric information from a tail part of the mouse (see, for example, Non-Patent Literature 2).

However, in the method of anesthetizing a mouse, there is a risk that the mouse may be physically affected by the anesthetic. In the method of acquiring biometric information from a tail part of a mouse, the mouse is placed in a pouch to restrict (restrain) its movement during acquisition of the biometric information from the tail part thereof. Such restriction of the movement gives stress to the mouse, which causes fluctuation in values of the biometric information between a restricted state and an unrestricted state. This may result in a failure of acquisition of the biometric information in the state where the mouse is not feeling stress.

In recent years, there has been introduced a technology for acquiring biometric information on a subject from an image showing, for example, the skin of a person's face (see, for example, Patent Literature 2). In this connection, a method of using captured images of a mouse in a cage, which includes the processes of shaving the body hair on the back of the mouse in the cage to expose the skin without restricting the movement thereof and capturing images of the exposed skin on the back by a camera, can be one of the options for acquiring the biometric information on the mouse.

CITATION LIST

Patent Literature

Patent Literature 1: JP-A-2019-092532
Patent Literature 2: JP-A-2007-050144

Non-Patent Literature

Non-Patent Literature 1: "Vital Signs Monitoring System for Small Animals" on website of BIO Research Center Co., Ltd., <https://product.brck.co.jp/index.php/maker/h/harvardappara tus/vitalmonitoring>(retrieved on Nov. 1, 2020)

Non-Patent Literature 2: "Blood Pressure Measurement for Laboratory Animals" on website of Softron Co., Ltd., <http://www.softron-tokyo.co.jp/seihin.html>(retrieved on Nov. 1, 2020)

SUMMARY OF INVENTION

Technical Problem

However, in the above-mentioned method of acquiring biometric information from images of the skin on the back of a mouse, since the mouse can move freely within the cage, the camera may not be able to capture the images of the exposed skin on the back depending on the behavior of the mouse such as standing up. This also may result in a failure of acquisition of the biometric information on the mouse.

The present invention has been made to solve the problems described above, and thus an object of the present invention is to provide a biometric information acquisition method of acquiring biometric information on small animals without being affected by the movements of the small animals and also without giving stress to the small animals, a biometric information acquisition program, and a biometric information acquisition device.

Solution to Problem

The present invention comprises the steps of: acquiring pieces of image information on a hand and/or a foot of a quadrupedal small animal; extracting a predetermined piece of signal information from among the pieces of image information that have been acquired; and processing the predetermined piece of the signal information which has been extracted so as to acquire biometric information on the small animal.

The present invention further comprises the step of capturing an image of an abdominal side of the small animal.

The present invention further comprises the step of capturing an image of the small animal from below a location of the small animal.

The present invention causes a computer to execute the steps of: acquiring pieces of image information on a hand and/or a foot of a quadrupedal small animal; extracting a predetermined piece of signal information from among the pieces of image information that have been acquired; and processing the predetermined piece of the signal information which has been extracted so as to acquire biometric information on the small animal.

The present invention comprises: an image information acquisition section configured to acquire pieces of image information on a hand and/or a foot of a quadrupedal small animal; a signal information extraction section configured to extract a predetermined piece of signal information from among the pieces of image information that have been acquired; and a biometric information acquisition section configured to process the predetermined piece of the signal information which has been extracted so as to acquire biometric information on the small animal.

Advantageous Effects of Invention

According to the present invention, it is possible to acquire biometric information on small animals without being affected by the movements of the small animals and also without giving stress to the small animals.

BRIEF DESCRIPTION OF DRAWINGS

FIG. 11 illustrates an image of a foot of a mouse captured by the biometric information acquisition device for small animals according to the present embodiment.

FIG. 12 illustrates an overall configuration of a biometric information acquisition system for small animals according to the present embodiment.

DESCRIPTION OF EMBODIMENTS

Hereinafter, a method of acquiring biometric information on small animals according to an embodiment of the present invention and a biometric information acquisition device used in this method will be described with reference to FIG. 1 to FIG. 12.

(Configuration of Biometric Information Acquisition Device)

Firstly, a biometric information acquisition device 1 according to the present embodiment will be described.

Figure 1:
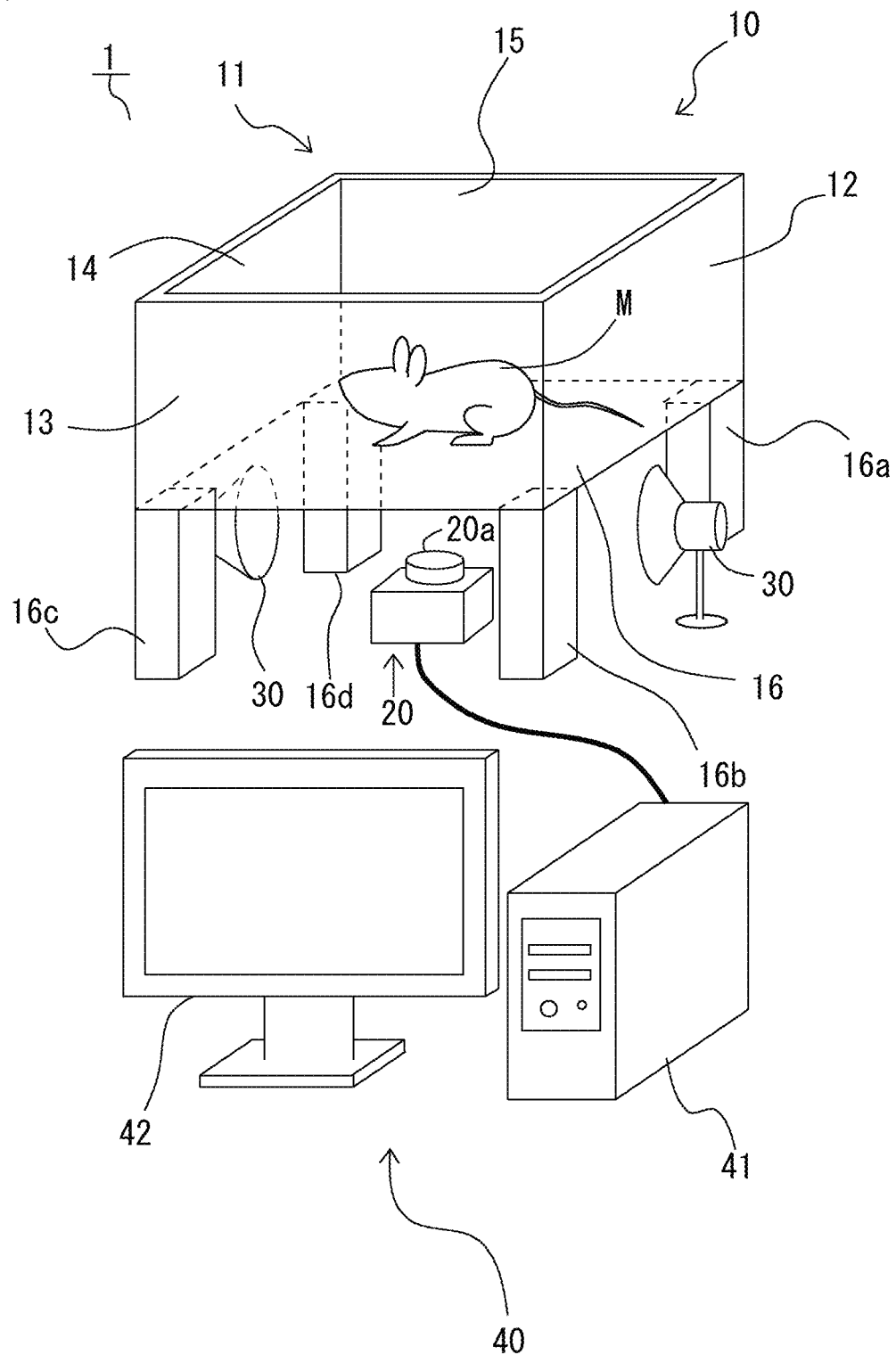
FIG. 1 is an overall view of a biometric information acquisition device for small animals according to the present embodiment.

As illustrated in FIG. 1, the biometric information acquisition device 1 includes a housing unit 10, an image information acquisition unit 20, lighting units 30, and an information processing unit 40.

<Housing Unit>

The housing unit 10 is provided for housing small animals whose biometric information is to be acquired, and is formed with a cage 10. In the present embodiment, small animals such as a rat or a mouse M are placed in the cage 10. In the following, an example of acquiring biometric information on the mouse M will be described.

The cage 10 is formed in a substantially rectangular shape whose top portion 11 is opened, and the mouse M is carried in and out of the cage 10 from the side of the opened top portion 11. The cage 10 also includes four side portions 12, 13, 14, 15 and a bottom portion 16 each of which is made of a transparent glass plate. Thus, the mouse M in the cage 10 is visible from outside of each side surface of the cage 10 and from outside of the bottom of the cage 10.

At the four corners of the bottom portion 16 of the cage 10, legs 16a, 16b, 16c, 16D for supporting the cage 10 are provided, respectively. Each of the legs 16a, 16b, 16c, 16d is formed in a rectangular shape, and extends in the direction opposite to the bottom portion 16 (toward the lower direction of the cage 10). The legs 16a, 16b, 16c, 16d allow the cage 10 to be positioned at a predetermined height, whereby a predetermined space is generated between the bottom portion 16 of the cage 10 and a mounting surface of a mounting table (not illustrated) on which the cage 10 is mounted.

<Image Information Acquisition Unit>

The image information acquisition unit 20 is configured to acquire images of the mouse M, and includes an RGB camera 20. The RGB camera 20 is equipped with a plurality of detecting elements that is sensitive to the light intensity in the wavelength regions corresponding to each color of R (red), G (green), and B (blue), and is configured to acquire image information.

As illustrated in FIG. 1, the RGB camera 20 is installed between the bottom portion 16 and the mounting surface on which the cage 10 is mounted. That is, the RGB camera 20 is installed at the lower side of the bottom portion 16 of the cage 10. Furthermore, the RGB camera 20 is installed with a lens portion 20a facing in the direction toward the bottom portion 16 of the cage 10 so as to capture images of the abdomen side of the mouse M in the cage 10.

<Lighting Unit>

Each of the lighting units 30 is provided for illuminating the mouse M in the cage 10, and is formed with an LED light. The LED lights 30 are installed between the bottom portion 16 of the cage 10 and the mounting surface on which the cage 10 is mounted, and arranged on the left and right sides of the RGB camera 20, respectively. This arrangement allows the LED lights 30 to illuminate the mouse M in the cage 10 from the side of the bottom portion 16 of the cage 10.

In the present embodiment, each of the lighting units 30 is formed with LED lights, however, infrared lamps may be used to illuminate the mouse M. Since the mouse M reacts to visible light, it is suitable to illuminate the mouse M with the infrared lamps if the influence of visible light on the mouse M is to be avoided.

<Information Processing Unit>

The information processing unit 40 is configured to process image information on the mouse M captured by the RGB camera 20, and formed with a personal computer (hereinafter, simply referred to as "PC") 40. The PC 40 includes a server device 41 that processes and stores various pieces of information, and a display 42 that displays various images.

The server device 41 is connected to the RGB camera 20 and the display 42, and thus can receive the image information from the RGB camera 20. In addition to the RGB camera 20 and the display 42, the server device 41 can also be connected to various other devices (not illustrated) such as a keyboard and a printer.

Figure 2:
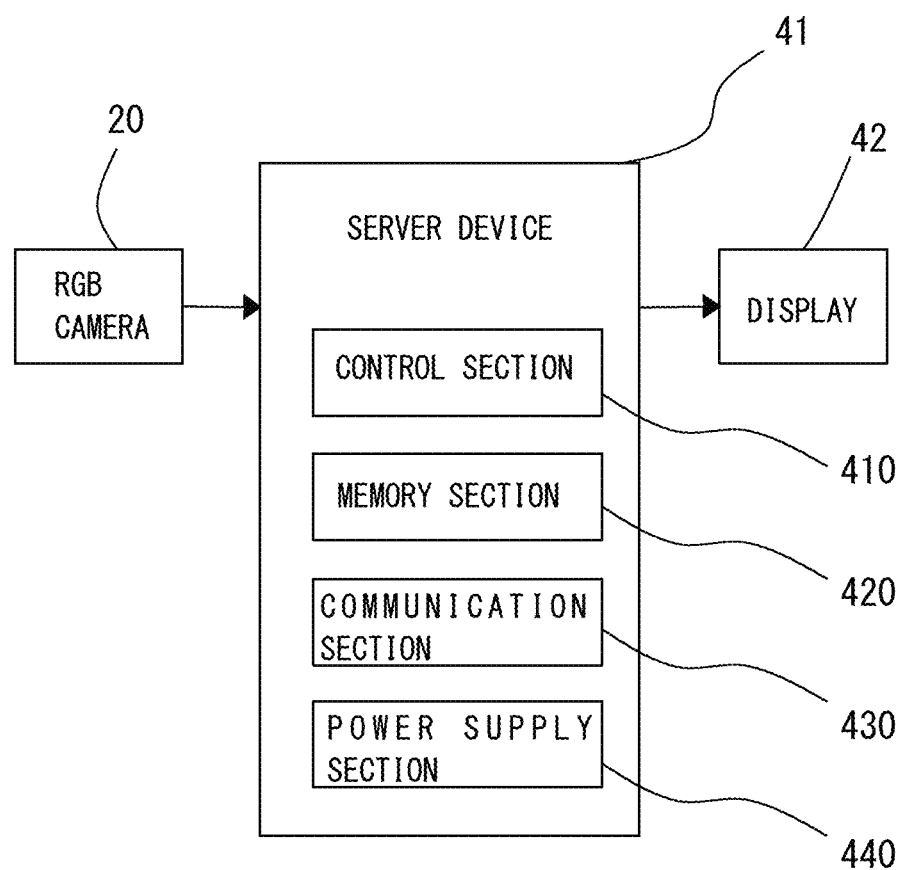
FIG. 2 is a block diagram of a server device which is a part of the biometric information acquisition device for small animals according to the present embodiment.

As illustrated in FIG. 2, the server device 41 includes a control section 410, a memory section 420, a communication section 430, and a power supply section 440.

The control section 410 is configured to control the overall operations of the biometric information acquisition device 1, namely, the operations of the server device 41, the operations of the RGB camera 20 connected to the server device 41, and the operations of the display 42.

The control section 410 includes, for example, a CPU (Central Processing Unit) serving as a processor, a ROM (Read Only Memory) serving as a memory, and/or a RAM (Random Access Memory) serving as a memory.

The memory section 420 is formed with, for example, an SSD (Solid State Drive) or an HDD each of which serves as a semiconductor memory, and is configured to store information acquired by the control section 410.

The communication section 430 is configured to communicate with external devices over networks such as other server devices.

The power supply section 440 is configured to receive instructions from the control section 410 and supply power to each section of the server device depending on whether it is turned on or off. The control section 410, the memory section 420, and the communication section 430 are connected to each other by an internal bus (not illustrated).

The server device 41 also includes a connection section (not illustrated) to which an external information memory medium such as a USB memory is connected.

Figure 3:
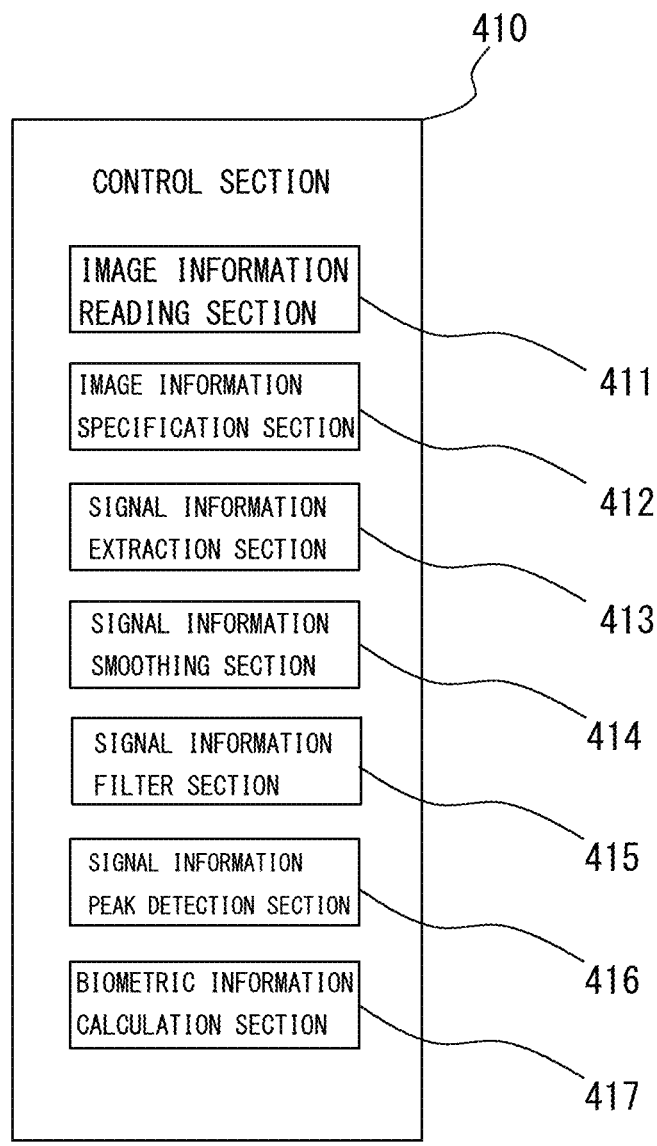
FIG. 3 is a block diagram of a control section of the server device which is a part of the biometric information acquisition device for small animals according to the present embodiment.

As illustrated in FIG. 3, the CPU loads an information processing program stored in the ROM onto the RAM and executes it, whereby the control section 410 functions as an image information reading section 411, an image information specification section 412, a signal information extraction section 413, a signal information smoothing section 414, a signal information filter section 415, a signal information peak detection section 416, and a biometric information calculation section 417.

The image information reading section 411 is configured to cause the RGB camera 20 connected to the server device 41 to capture images, and then read (load) the images (moving images) captured and obtained by the RGB camera 20 into the control section 410.

The image information specification section 412 is configured to specify, among pieces of the image information read by the control section 410, a piece of the image information from which the signals are to be extracted by the signal information extraction section 413.

Specifically, the image information specification section 412 is configured to automatically specify, among the moving images captured by the RGB camera 20, a moving image in which the mouse M is motionless for a certain period of time. Furthermore, the image information specification section 412 is configured to automatically specify images of the foot (the sole of the foot) L of the mouse among the images of the abdomen side of the mouse M.

In the present embodiment, the image information specification section 412 is configured to automatically specify the images showing the motionless state and/or the foot L of the mouse M, however, the present invention is not limited thereto. The image information specification section 412 may be configured to specify the images based on an operation signal output from a keyboard or other means. In other words, the image information specification section 412 may be configured to manually specify the images.

The signal information extraction section 413 is configured to extract, among the RGB signals in the image of the foot L of the mouse M which has been specified by the image information specification section 412, G signals that are predetermined signals in the present invention. Here, the G signals refer to green component image signals, R signals refer to red component image signals, and B signals refer to blue component image signals.

The signal information smoothing section 414 is configured to remove unnecessary signals, which are so-called noise, contained in the signal information.

The signal information filter section 415 is configured to extract signals of specific frequencies. The signal information filter section 415 uses a bandpass filter program stored in the memory to extract these signals.

The signal information peak detection section 416 is configured to detect peaks of signals which change periodically.

The biometric information calculation section 417 is configured to calculate various pieces of biometric information on the mouse M based on the peak-to-peak intervals of the signals detected by the signal information peak detection section 416.

In the present invention, the signal information smoothing section 414, the signal information filter section 415, the signal information peak detection section 416, and the biometric information calculation section 417 define a biometric information acquisition section of the present invention.

(Methods of Acquiring Biometric Information on Mouse)

Figure 4:
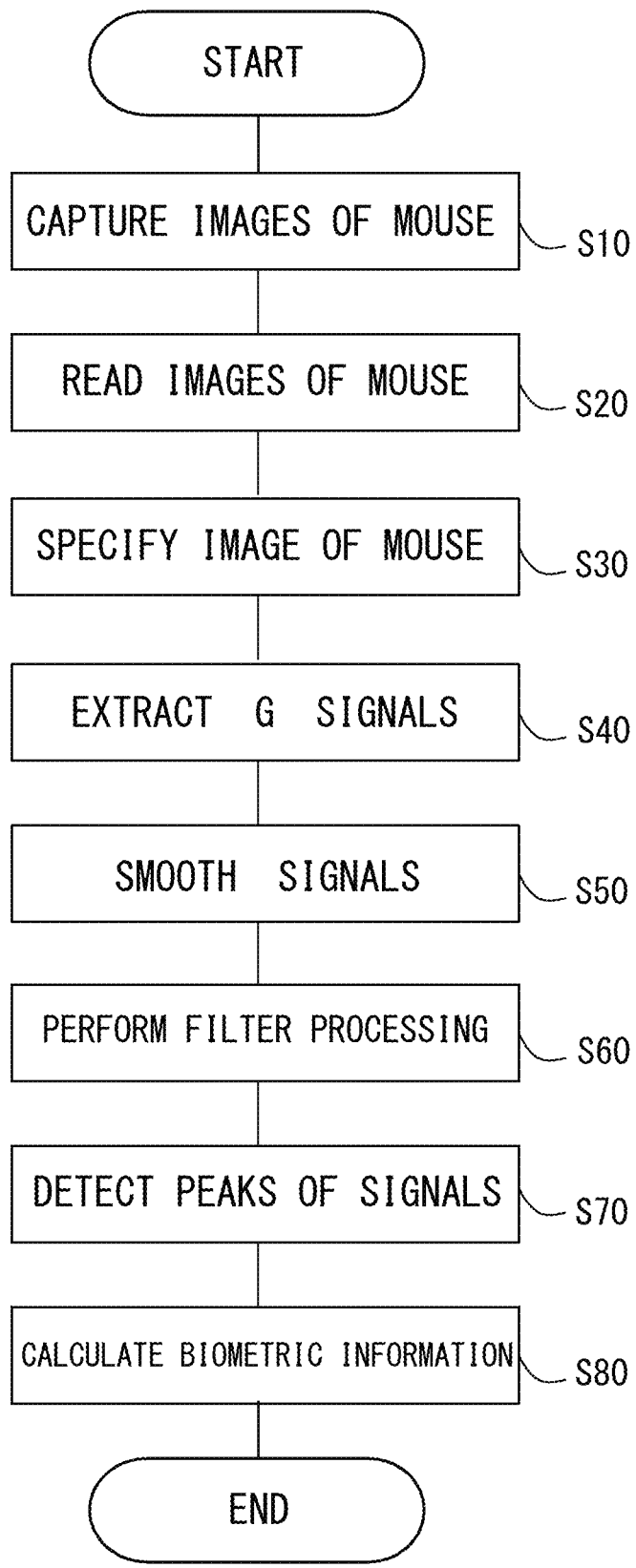
FIG. 4 illustrates a flow of a method of acquiring biometric information on small animals according to the present embodiment.

Next, a method of acquiring biometric information on the mouse M using the biometric information acquisition device 1 will be described with reference to FIG. 4.

The RGB camera 20 is used to capture the images of the mouse M in the cage 10 (STEP 10, hereafter simply referred to as "step S . . . ").

As described above, the RGB camera 20 is installed at the lower side of the bottom portion 16 of the cage 10, and the lens portion 20a of the RGB camera 20 faces in the direction toward the bottom portion 16 of the cage 10. Thus, the RGB camera 20 captures the images of the abdomen side of the mouse M from the lower side of the mouse M.

The image information on the mouse M captured by the RGB camera 20 is mainly an image (moving image) of the abdomen of the mouse M. The image of the abdomen of the mouse M includes an image of the foot L of the mouse M, and the image of the foot L shows the sole of the foot of the mouse M which is in contact with the bottom portion 16 (see FIG. 5).

Here, since the heart rate is different between the mouse M and a human, the frame rate (fps) of the RGB camera 20 at the time of capturing images of the mouse M is set to be, for example, 250 fps which is more than the frame rate (about 60 fps) at the time of capturing images of a human.

After capturing the images of the mouse M, the RGB camera 20 sends the pieces of image information of the captured images to the server device 41. The image information reading section 411 reads (stores) the pieces of image information on the mouse M which have been sent to the server device 41 into the memory of the control section 410 (step S20).

Figure 5:
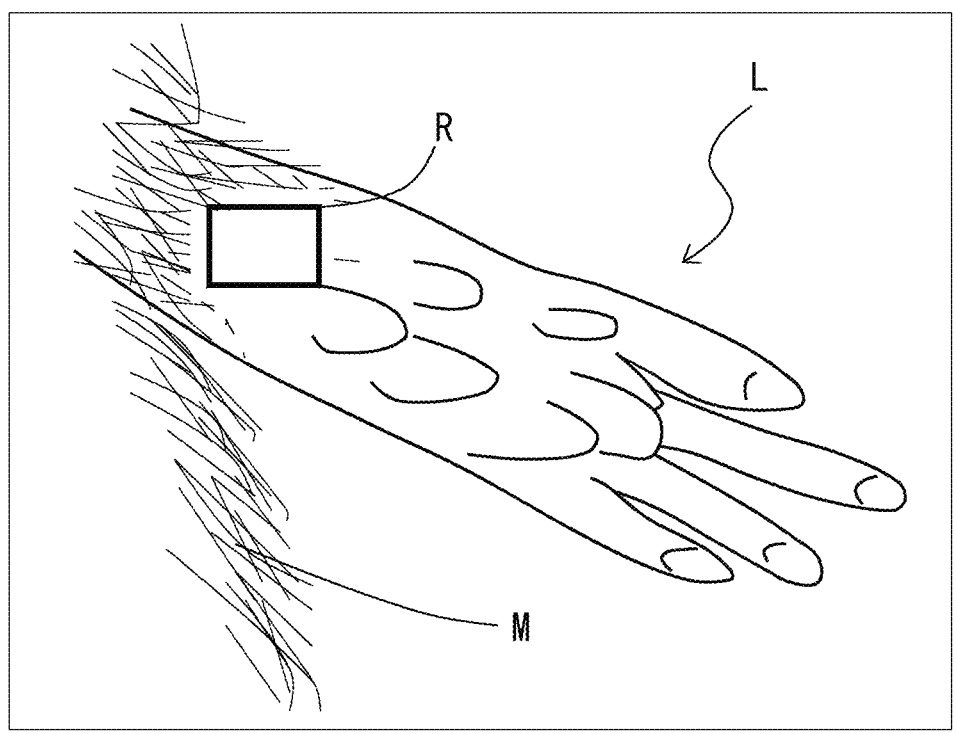
FIG. 5 illustrates an image of a foot of a mouse captured by the biometric information acquisition device for small animals according to the present embodiment.

After the pieces of image information on the mouse M are read into the server device 41, the image information specification section 412 specifies, among the moving images which have been read, a moving image in which the mouse M is motionless for a certain period of time. The image information specification section 412 further specifies the sole part of the foot L of the mouse M from the specified moving image. Furthermore, as illustrated in FIG. 5, the image information specification section 412 specifies an image area R, from which the signals are to be extracted, from the specified image of the sole of the foot (step S30).

After the image area R from which the signals are to be extracted is specified, the signal information extraction section 413 extracts G signals from the specified image area (step S40). Specifically, the signal information extraction section 413 confirms each signal component obtained from the image area R by the Fast Fourier Transform processing or the Wavelet Transformation processing.

After the G signals are extracted, the signal information smoothing section 414 removes unnecessary signal information from the extracted (confirmed) G signals to smooth the G signals (step S50).

After the G signals are smoothed, the signal information filter section 415 performs the bandpass filter processing to extract signals of specific frequencies for the smoothed G signals (step S60). Specifically, in this processing, the signal information filter section 415 extracts respiration signals and heart rate signals of the mouse M, respectively.

After the bandpass filter processing is performed and the respiration signals and heart rate signals of the mouse M are extracted, the signal information peak detection section 416 detects the peaks of the respiration signals and heart rate signals which periodically change (step S70).

After the peaks of the respiration signals and heart rate signals of the mouse M are detected as described above, the biometric information calculation section 417 calculates the respiratory rate and heart rate of the mouse M based on the number of peaks per unit time. Furthermore, the biometric information calculation section 417 calculates various pieces of biometric information such as changes in the respiratory rate and heart rate of the mouse M based on the intervals between the peaks (step S80).

The various pieces of biometric information on the mouse M, such as the detected respiratory rate and heart rate, are stored in the memory and displayed on the display 42 or the like.

As described above, biometric information such as the respiratory rate and heart rate of the mouse M is calculated from the images of the foot L of the mouse M. Since implantation of an electrocardiograph for calculating such as the respiratory rate and heart rate into the body of the mouse M is not necessary, there is no need to incise the body of the mouse M. As a result, it is possible to calculate biometric information such as the respiratory rate and heart rate of the mouse M without causing physical burden and/or stress to the mouse M.

Furthermore, the images of the abdominal side of the mouse M are captured at the time of photographing the mouse M, thereby enabling acquisition of, not only the images of the abdominal side of the mouse M, but also the images of the foot L of the mouse M. As a result, it is possible to acquire the images of the foot L, which are necessary for calculating the respiratory rate and heart rate of the mouse M, through an operation of capturing images of the mouse M.

Still further, the RGB camera is installed at the lower side of the bottom portion 16 of the cage 10 that is made of a transparent glass plate so that the images of the mouse M can be captured from below the position of the mouse M in the cage 10. This allows the RGB camera 20 to capture the images of the hand (palm) and/or foot (sole) L of the mouse M which is in contact with the bottom portion 16 of the cage 10, and thus the respiratory rate and heart rate of the mouse M can be calculated from the images of the foot thereof. As a result, since the respiratory rate and heart rate of the mouse M can be calculated without restricting the movement of the mouse M by, for example, fixing the mouse M to capture the images of the foot L, it is possible to calculate biometric information on the mouse M that is in a natural state without giving stress thereto. Furthermore, the foot L of the mouse M is always in contact with the bottom portion 16 within the cage 10, and accordingly, for example, even when the mouse M stands up, the respiratory rate and heart rate of the mouse M can be calculated from the images of the foot L that is in contact with the bottom part 16. This makes it possible to calculate biometric information on the mouse M without being affected by the movement of the mouse M in the cage 10.

In the present embodiment, the RGB camera 20 is used to capture images of the foot L of the mouse M, however, the present invention is not limited thereto as long as a camera to be used can capture images from which signals allowing the pulse wave of the mouse to be detected can be extracted. For example, an infrared camera may be used to capture images of the foot L of the mouse M so as to calculate the respiratory rate and heart rate of the mouse M based on the infrared light. Since the mouse M reacts to visible light, this is especially effective when the influence of light on the mouse M is to be reduced.

Still further, in the present embodiment, the biometric information on the mouse M is calculated based on the G signals extracted from the image information, however, the present invention is not limited thereto. For example, biometric information on the mouse M may be calculated based on the R signals or the B signals, or combinations of each of the R, G, and B signals.

Still further, in the present embodiment, the respiratory rate and heart rate of the mouse M, as well as changes in the respiratory rate and heart rate of the mouse M are calculated based on the G signals, however, the present invention is not limited thereto. For example, various pieces of biometric information on the mouse M, such as blood pressure, blood oxygen saturation, and a value of bilirubin, can also be calculated based on the RGB signals or infrared light.

Still further, in the present embodiment, the foot L of the mouse M is specified from the images captured by the RGB camera 20 for the purpose of calculation of the respiratory rate and heart rate of the mouse M from the captured images of the foot L, however, the present invention is not limited thereto. For example, the hand (palm) of the mouse M may be specified from the images for the purpose of calculation of biometric information such as the respiratory rate and heart rate of the mouse M from the hand or foot L, or both of them. That is, any images can be used for calculation as long as they show the hand or foot L of the mouse M.

Still further, in the present embodiment, the RGB camera 20 connected to the server device 41 is used for capturing images of the foot L of the mouse M to calculate the respiratory rate, heart rate, and the like of the mouse M from the captured images, however, the present invention is not limited thereto. For example, the image information on the foot L of the mouse M obtained by a camera other than the biometric information acquisition device 1 may be used to calculate biometric information such as the respiratory rate and heart rate of the mouse M. The image information obtained described above is transferred to the server device 41 via the Internet or a USB memory, and then the calculation of biometric information is performed using the transferred image information.

Still further, in the present embodiment, the camera 20 is installed at the lower side of the bottom portion 16 of the cage 10 so as to capture images of the abdominal side of the mouse M from the lower side of the mouse M in the cage 10. However, the present invention is not limited thereto as long as a camera to be used is designed to capture images of the abdominal side including the hand and foot L of the mouse M. For example, a reflective object such as a mirror is installed at the lower side of the bottom portion 16 of the cage 10 so that the RGB camera 20 can take images of the abdominal side including the hand and foot L of the mouse M reflected in the mirror from the upper side of the cage 10 (from above the mouse M).

Still further, in the present embodiment, the mouse M is used as an example of small animals which are targets of biometric information acquisition, however, the present invention is not limited thereto. For example, other animals such as dogs or cats may be used. That is, any animals can be placed as long as they have the skins such as the palms of the hands and/or soles of the feet, which are in contact with the bottom portion 16 when they are in the cage 10.

The present invention is not limited to the embodiment described above, but includes modifications within the scope of the object to be achieved of the invention. Some modifications of the present embodiment will be described below. Note that, in the following, the modifications will be described only with respect to the points that differ from the embodiment which has been already described above. The same reference signs are provided with the same features, and the repetitive explanation therefor will be omitted.

First Modification (Configuration of Biometric Information Acquisition Device)

Figure 6:
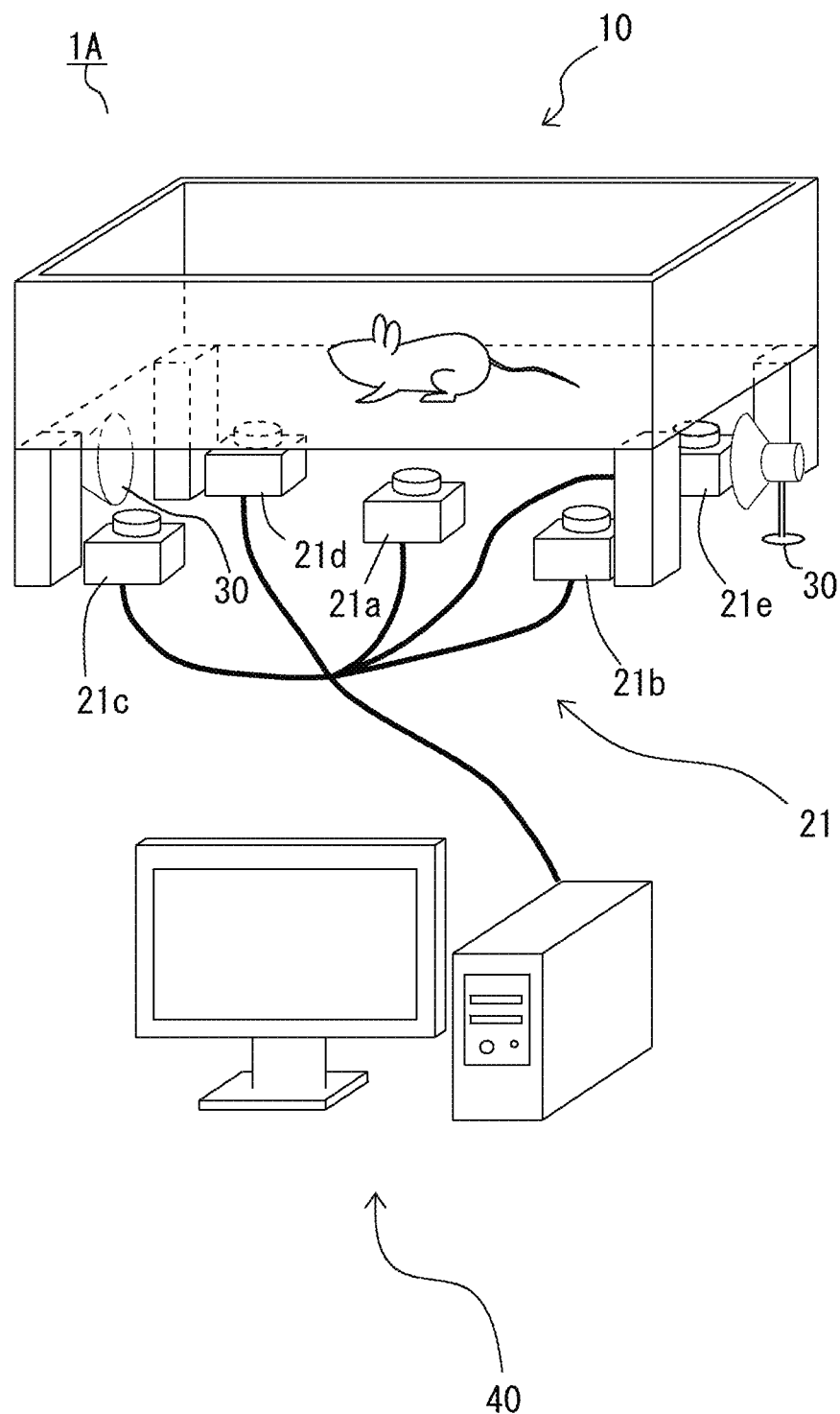
FIG. 6 is an overall view of a biometric information acquisition device for small animals according to the present embodiment.

An image information acquisition unit 21 of a biometric information acquisition device 1A according to a first modification includes a plurality of RGB cameras. In the first modification, as illustrated in FIG. 6, the RGB camera includes five RGB cameras, namely, the RGB cameras 21a, 21b, 21c, 21d, 21e. The RGB cameras 21a, 21b, 21c, 21d, 21e are installed in the four corners and near the center of the bottom portion 16, respectively, so as to capture images of the entire bottom portion 16 of the cage 10.

Figure 7:
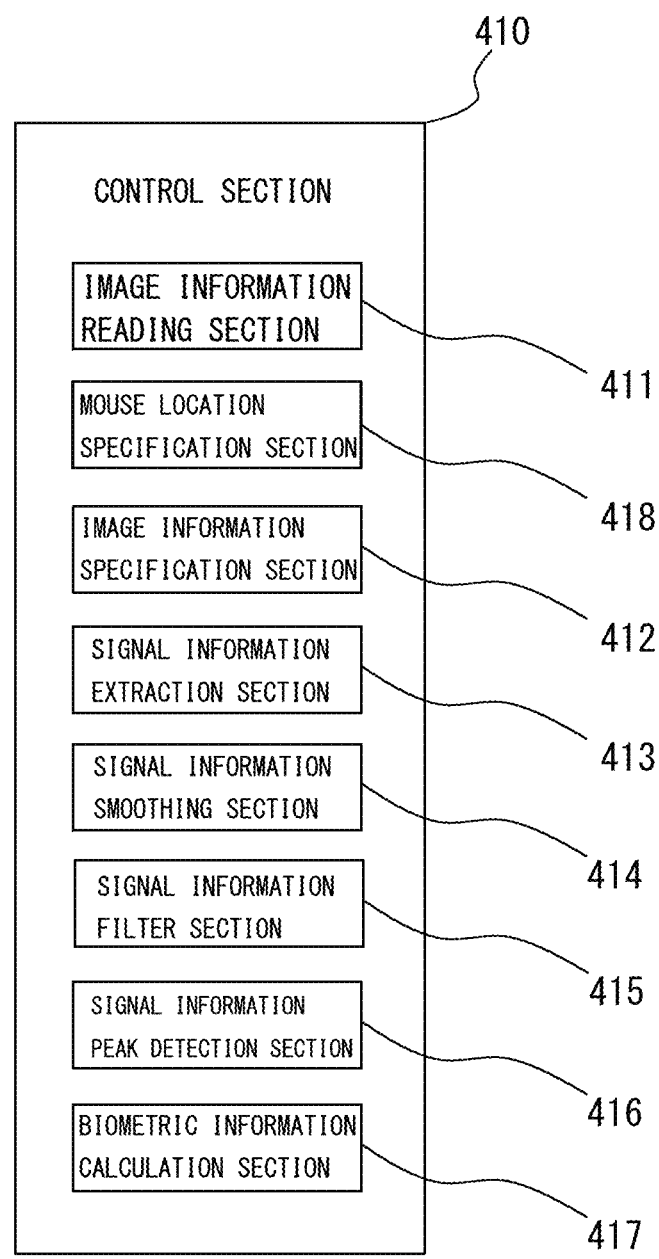
FIG. 7 is a block diagram of a control section of the server device which is a part of the biometric information acquisition device for small animals according to the present embodiment.

As illustrated in FIG. 7, the control section 410 also functions as a mouse location specification section 418. The mouse location specification section 418 is configured to specify the location of the mouse M in the cage 10 from the images captured by the RGB cameras 21a, 21b, 21c, 21d, 21e.

(Method of Acquiring Biometric Information on Mouse)

Figure 8:
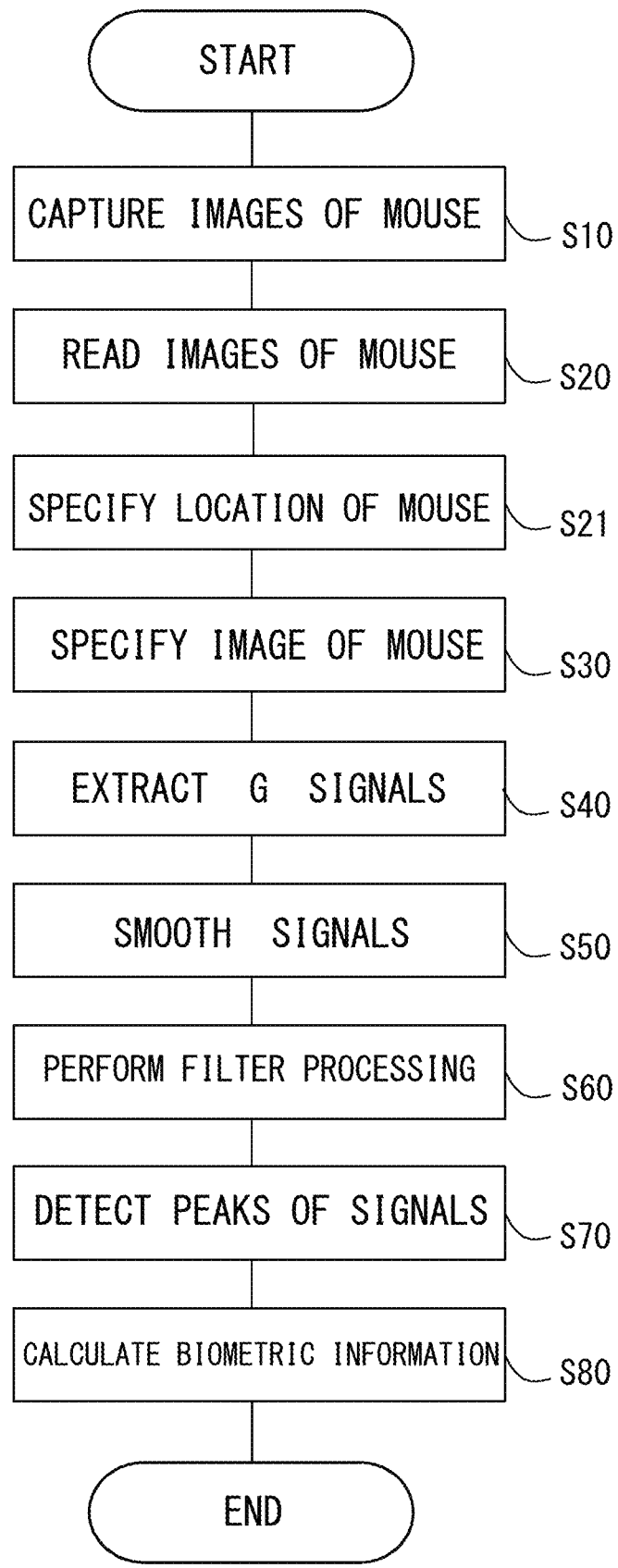
FIG. 8 illustrates a flow of a method of acquiring biometric information on small animals according to the present embodiment.

Next, a method of acquiring biometric information on the mouse M using the biometric information acquisition device 1 will be described with reference to FIG. 8.

In the first modification, upon acquiring the image information on the mouse M by the five RGB cameras 21a, 21b, 21c, 21d, 21e (step S10), the location of the mouse M within the cage 10 is specified from the acquired image information (step S21). Then, after specifying the location of the mouse M, the biometric information on the mouse M is acquired (steps S30 to S80).

As described above, in the first modification, the plurality of RGB cameras 21a, 21b, 21c, 21d, 21e captures images of the mouse M, thereby enabling specification of the location of the mouse M within the cage 10. This makes it possible to observe the behavior of the mouse M within the cage 10. Furthermore, it is also possible to calculate the respiratory rate, heart rate, and the like in accordance with a position of the mouse M in the cage 10, whereby the biometric information in accordance with the behavior of the mouse M can be obtained.

In the first modification, the five RGB cameras 21a, 21b, 21c, 21d, 21e are installed at the lower side of the bottom portion 16 of the cage 10, however, the present invention is not limited thereto. The number of RGB cameras to be installed may be, for example, three or eight. That is, as long as the plurality of RGB cameras can capture the images of the entire bottom portion 16 of the cage 10, the number of cameras to be installed and/or positions thereof can be arbitrarily set.

Second Modification (Configuration of Biometric Information Acquisition Device)

Figure 9:
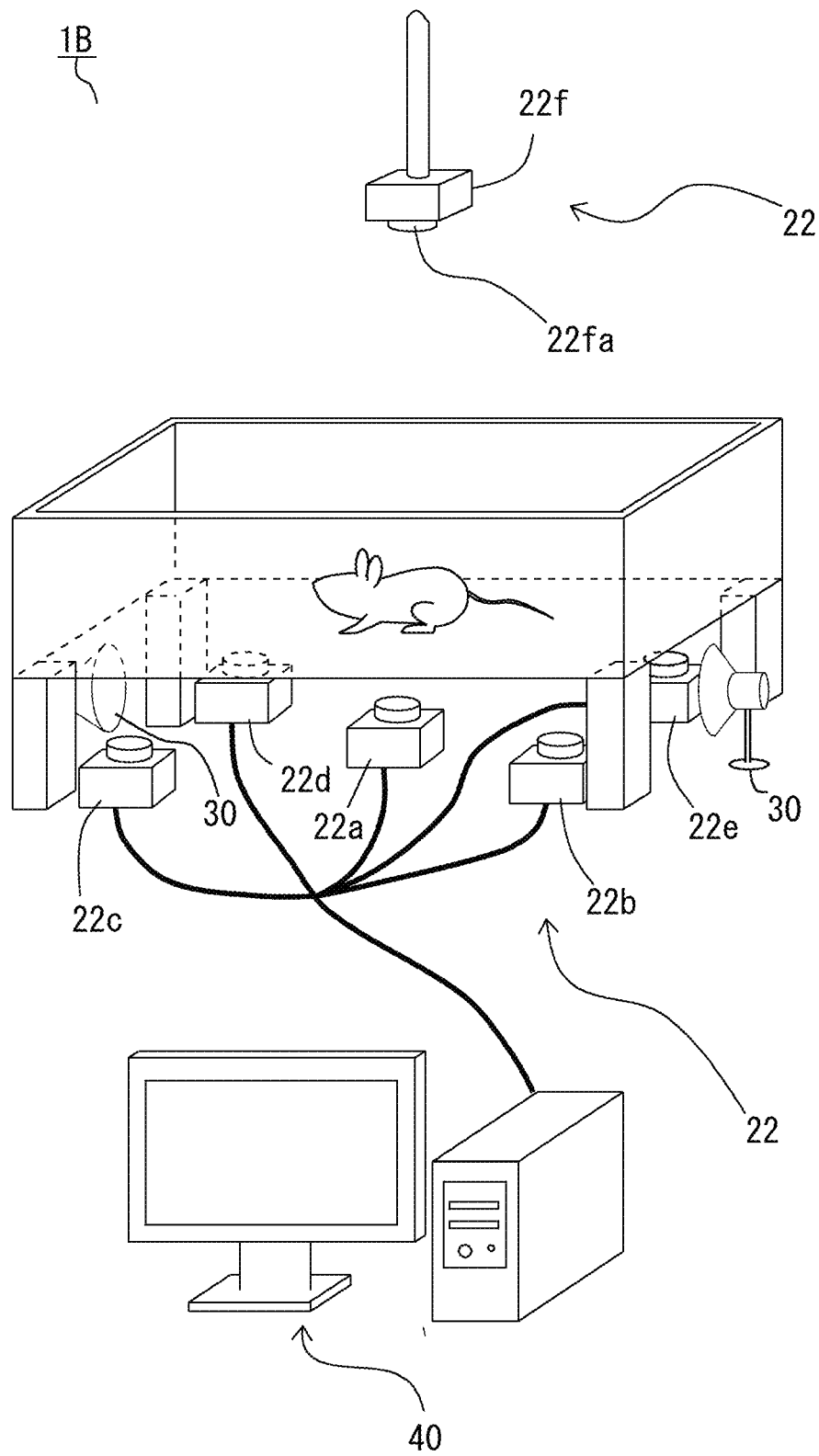
FIG. 9 is an overall view of a biometric information acquisition device for small animals according to the present embodiment.

An image information acquisition unit 22 of a biometric information acquisition device 1B according to a second modification includes a plurality of RGB cameras. In the second modification, in the same manner as the first modification, five RGB cameras 22a, 22b, 22c, 22d, 22e are installed in the four corners and near the center of the bottom portion 16, respectively, so as to capture images of the entire bottom portion 16 of the cage 10. In addition, as illustrated in FIG. 9, the image information acquisition unit 22 further includes a RGB camera 22f at the upper side of the cage 10.

The RGB camera 22f at the upper side of the cage 10 is installed with a lens 22fa facing in the direction toward the side of the cage 10 in order to capture images of the mouse M in the cage 10. Thus, in the second modification, the RGB camera 22f is used to capture the images of the mouse in the cage 10 from the upper side as well. In other words, in the second modification, the images of the mouse M in the cage 10 are captured from the upper and lower sides.

Then, in the second modification, the respiratory rate, heart rate, and the like are calculated from the images of the foot L of the mouse M captured by the RGB cameras 22a, 22b, 22c, 22d, 22e installed at the lower side of the cage 10. In addition, in the second modification, a locus of the behavior of the mouse M in the cage 10 is specified from the images of the mouse M captured by the RGB camera 22f installed at the upper side of the cage 10. The specified locus is used to calculate, for example, the amount of locomotion of the mouse M in the cage 10.

As described above, the respiratory rate, heart rate, and the like of the mouse M are calculated from the images captured by the RGB cameras 22a, 22b, 22c, 22d, 22e installed at the lower side of the cage 10, and also, the amount of locomotion of the mouse M is calculated from the images captured by the RGB camera 22f installed at the upper side of the cage 10. This enables simultaneous measurement of the biometric information such as the respiratory rate and heart rate of the mouse M and the biometric information such as the amount of locomotion of the mouse M. As a result, the respiratory rate and heart rate of the mouse M can be measured in combination with the amount of locomotion, thereby making it possible to observe the mouse M based on various pieces of biological information.

In the second modification, the single RGB camera 22f is installed at the upper side of the cage 10, however, the present invention is not limited thereto. For example, the number of RGB cameras to be installed at the upper side of the cage 10 may be four. That is, as long as the locus of the behavior of the mouse M in the cage 10 can be specified, the number of cameras to be installed and/or positions thereof can be arbitrarily set.

Third Modification (Configuration of Biometric Information Acquisition Device)

Figure 10:
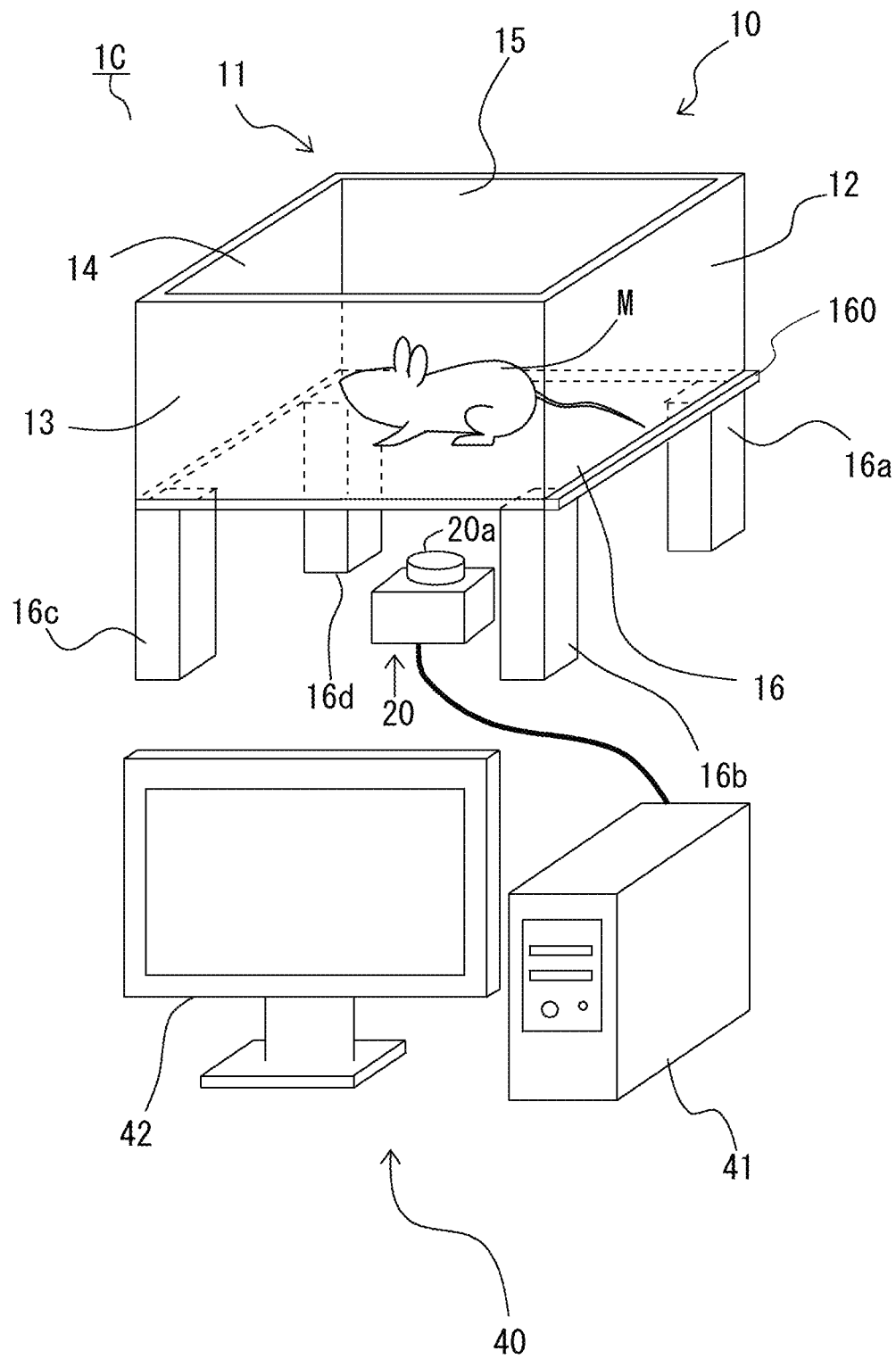
FIG. 10 is an overall view of a biometric information acquisition device for small animals according to the present embodiment.
Figure 1:
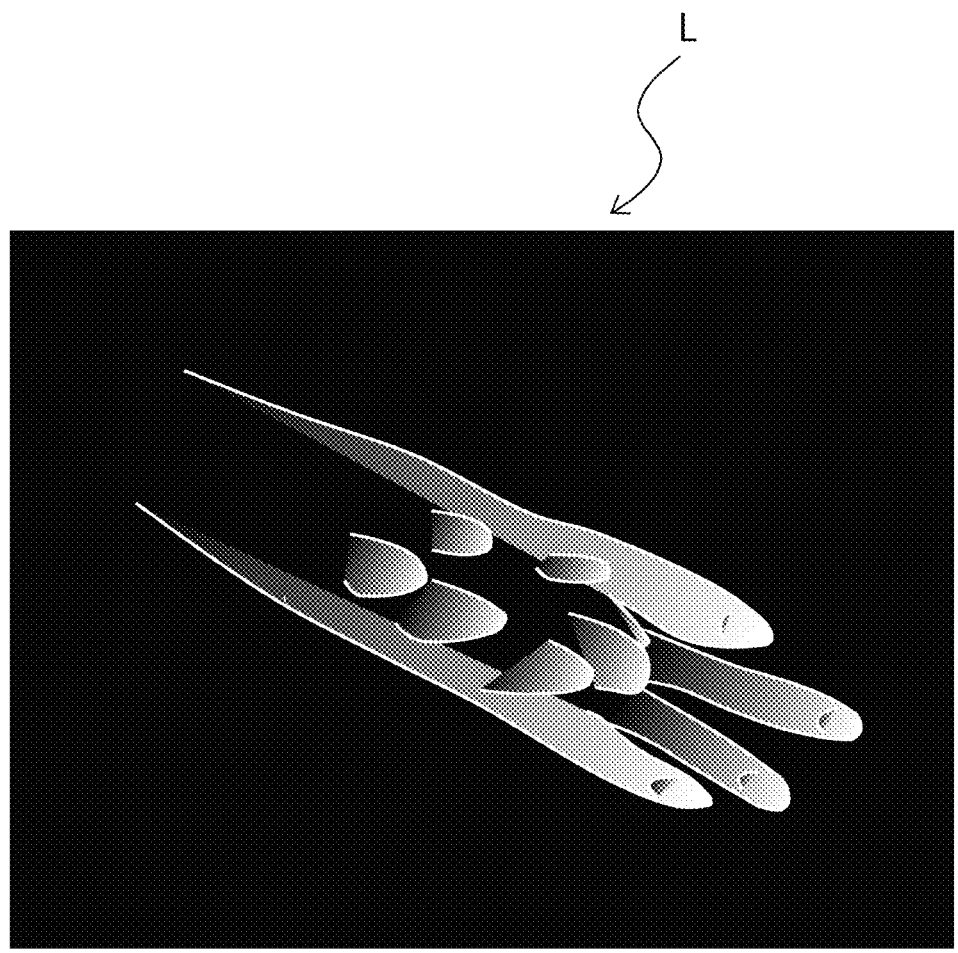
Figure 1:
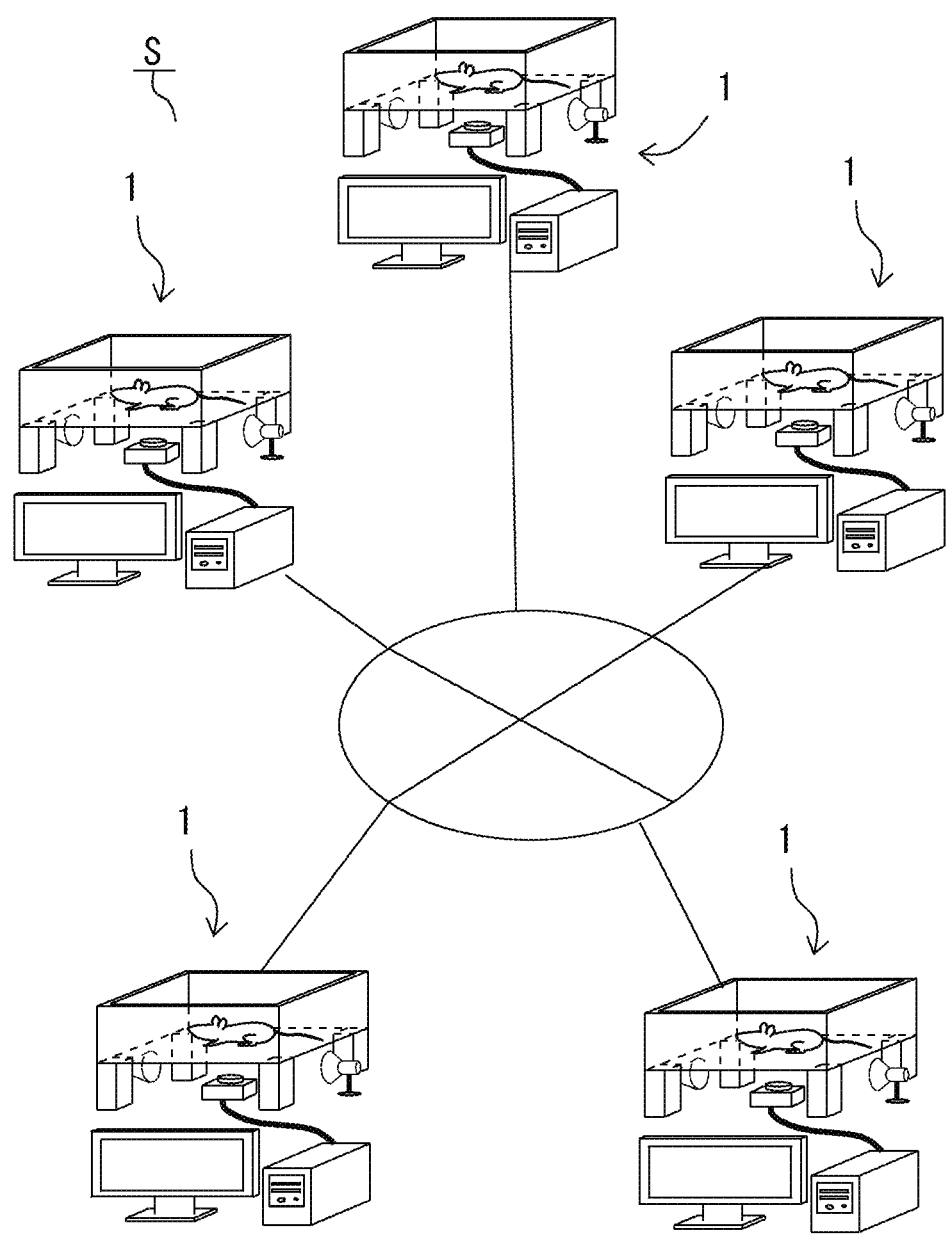

A biometric information acquisition device 1C according to a third modification includes the cage 10 whose bottom portion (bottom plate of the cage 10) 16 is made of an acrylic plate. Furthermore, as illustrated in FIG. 10, an LED lamp 160 is provided on one end side of the side surface of the bottom portion 16 made of the acrylic plate.

The LED lamp 160 is provided such that a light emission portion (not illustrated) thereof faces (comes in contact with) the side surface of the bottom portion 16 so as to illuminate the inside of the bottom portion 16 from the side surface of the bottom portion 16. This allows the light from the LED lamp 160 to enter only the acrylic plate that is the bottom portion 16.

In the third modification, the LED lamp 160 is provided in order to let the light enter only the acrylic plate. In this way, the light from the LED lamp 160 enters only the acrylic plate, thereby causing only a contact area where the mouse M is in contact with the front surface of the bottom portion 16 to emit light while the other non-contact areas do not.

Then, in the third modification, the mouse M is placed in the cage 10 in a state where the light from the LED lamp 16 keeps entering the bottom portion (acrylic plate) 16. On the front surface of the bottom portion 16, an area with which the mouse M is in contact emits light while the other areas do not. For example, the foot L of the mouse M in the cage 10 is in contact with the front surface of the bottom portion 16. On the contact area of the foot L (for example, the sole of the foot), as illustrated in FIG. 11, only a part of the bottom portion 16 with which the foot L is in contact emits light by the LED lamp 160 (illuminated by the LED lamp 160).

As described above, the LED lamp 160 is used to let the light therefrom enter only inside the acrylic plate that defines the bottom portion 16, thereby allowing the area of the bottom portion 16 where the mouse M (for example, the sole of the foot) is in contact to be illuminated (emit light). This makes it easier to acquire biometric information, such as the pulse wave of the mouse M, because the light enters the skin of the mouse M which is in contact with the bottom portion 16.

Furthermore, the light reaches only the area of the bottom portion 16 where the mouse M in the cage 10 is in contact, but does not reach the other areas. Accordingly, for example, the eyes of the mouse M do not receive light. This reduces the influence of the light from the LED lamp 160 on the mouse M. As a result, it is possible to reduce the influence of the light and acquire more accurate biometric information on the mouse M.

Still further, since only the foot L and/or hand that is in contact with the bottom portion 16 emits light, it is easy to track the foot L and/or hand that is emitting light, and by which the behavior history of the mouse M can be easily obtained.

In the third modification, the LED lamp 160 is provided on one end of the side surface of the bottom portion 16, however, the present invention is not limited thereto. The LED lamps 160 may be provided on both ends of the side surface of the bottom portion 16, respectively, or on all the side surfaces of the bottom portion 16, respectively. In other words, any means can be used as long as it can let the light therefrom enter only the acrylic plate that is the bottom portion 16.

Furthermore, in the third modification, the bottom portion 16 is made of an acrylic plate, however, the present invention is not limited thereto. For example, the bottom portion 16 may be made of polycarbonate, urethane, or glass. That is, any material can be used as long as it allows the light of the LED lamp 160 to enter the bottom portion 16 so as to cause the contact area of the foot L and/or hand of the mouse M to emit light when the foot L and the like comes into contact with the bottom portion 16.

Fourth Modification

As illustrated in FIG. 12, a system S for connecting a plurality of biometric information acquisition devices 1 located in different regions and places via the Internet to acquire biometric information on each mouse M may be constructed.

As described above, the biometric information acquisition devices 1 are connected to each other via the Internet, thereby enabling acquisition of biometric information on each mouse M in different places, respectively.

The present invention has been described as above, however, it is not limited to the embodiment and modifications described above. Other modifications, variations, and/or changes in the combinations of each feature can be made within the scope of the object to be achieved of the invention.

REFERENCE SIGNS LIST

M small animal (mouse)
I biometric information acquisition device
20 image information acquisition unit (RGB camera)
413 signal information extraction section
414 biometric information acquisition section (signal information smoothing section)
415 biometric information acquisition section (signal information filter section)
416 biometric information acquisition section (signal information peak detection section)
417 biometric information acquisition section (biometric information calculation section)

The invention claimed is:

1. A method of acquiring biometric information on small animals, the method comprising the steps of:
    capturing, by a camera at a lower side of a bottom portion of a cage and facing toward the bottom portion of the cage, images of a quadrupedal small animal, wherein an entirety of the quadrupedal small animal is inside the cage;
    acquiring, based on the captured images, pieces of image information on a hand or a foot of the quadrupedal small animal in contact with the bottom portion of the cage;

extracting a predetermined piece of signal information from among the pieces of image information that have been acquired, wherein the predetermined piece of signal information includes a color signal in the pieces of image information on the hand or foot of the quadrupedal small animal; and processing the predetermined piece of signal information which has been extracted so as to acquire biometric information on the quadrupedal small animal, wherein the processing of the predetermined piece of signal information includes filtering the extracted color signal to smooth the extracted color signal, performing a bandpass filter processing to the smoothed color signal to extract respiration signals and heart rate signals, detecting peaks of the respiration signals and peaks of the heart rate signals, and calculating, based on a number of peaks of the respiration signals per unit time and a number of peaks of the heart rate signals per unit time, a respiratory rate of the quadrupedal small animal and a heart rate of the quadrupedal small animal.

2. The method according to claim 1, further comprising: the step of capturing an image of an abdominal side of the quadrupedal small animal.

3. A non-transitory computer readable recording medium having stored therein a biometric information acquisition program for small animals that causes a computer to execute a process comprising:

capturing, by a camera at a lower side of a bottom portion of a cage and facing toward the bottom portion of the cage, images of a quadrupedal small animal, wherein an entirety of the quadrupedal small animal is inside the cage;

acquiring, based on the captured images, pieces of image information on a hand or a foot of the quadrupedal small animal in contact with the bottom portion of the cage;

extracting a predetermined piece of signal information from among the pieces of image information that have been acquired, wherein the predetermined piece of signal information includes a color signal in the pieces of image information on the hand or foot of the quadrupedal small animal; and processing the predetermined piece of signal information which has been extracted so as to acquire biometric information on the quadrupedal small animal, wherein the processing of the predetermined piece of signal information includes filtering the extracted color signal to smooth the extracted color signal, performing a bandpass filter processing to the smoothed color signal to extract respiration signals and heart rate signals, detecting peaks of the respiration signals and peaks of the heart rate signals, and calculating, based on a number of peaks of the respiration signals per unit time and a number of peaks of the heart rate signals per unit time, a respiratory rate of the quadrupedal small animal and a heart rate of the quadrupedal small animal.

4. A biometric information acquisition device for small animals, comprising:

an image information acquisition section including a camera, and configured to capture, by the camera at a lower side of a bottom portion of a cage and facing toward the bottom portion of the cage, images of a quadrupedal small animal, wherein an entirety of the quadrupedal small animal is inside the cage, and acquire, based on the captured images, pieces of image information on a hand or a foot of the quadrupedal small animal in contact with the bottom portion of the cage;

a signal information extraction section configured to extract a predetermined piece of signal information from among the pieces of image information that have been acquired, wherein the predetermined piece of signal information includes a color signal in the pieces of image information on the hand or foot of the quadrupedal small animal; and a biometric information acquisition section configured to process the predetermined piece of signal information which has been extracted so as to acquire biometric information on the quadrupedal small animal, wherein the process of the predetermined piece of signal information includes filtering the extracted color signal to smooth the extracted color signal, performing a bandpass filter processing to the smoothed color signal to extract respiration signals and heart rate signals, detecting peaks of the respiration signals and peaks of the heart rate signals, and calculating, based on a number of peaks of the respiration signals per unit time and a number of peaks of the heart rate signals per unit time, a respiratory rate of the quadrupedal small animal and a heart rate of the quadrupedal small animal.

\* \* \* \* \*